Sept. 6, 1927.
C. J. DALTON
VEHICLE WHEEL
Filed Dec. 13, 1922
1,641,663
2 Sheets-Sheet 1
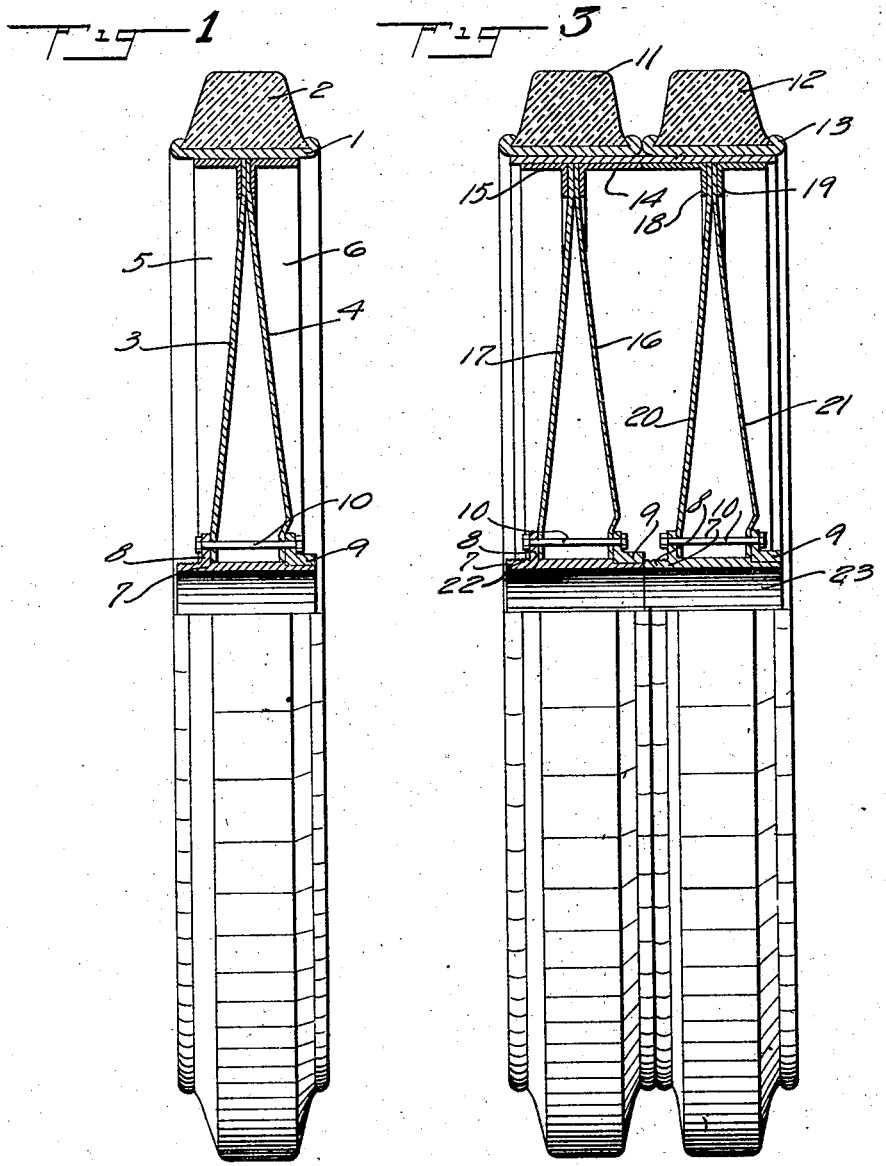
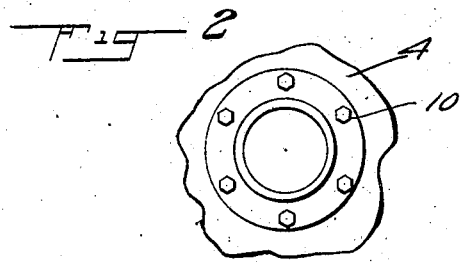
INVENTOR
C. J. Dalton
BY
Thomas Howe ATTORNEY Sept. 6, 1927.  C. J. DALTON  1,641,663
VEHICLE WHEEL
Filed Dec. 13, 1922   2 Sheets-Sheet 2
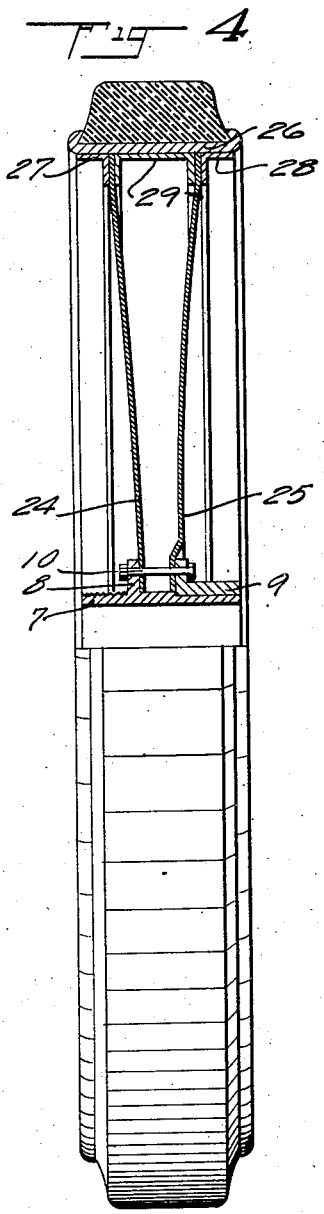
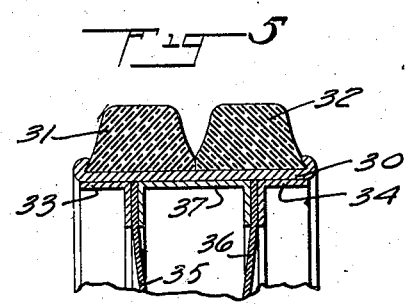
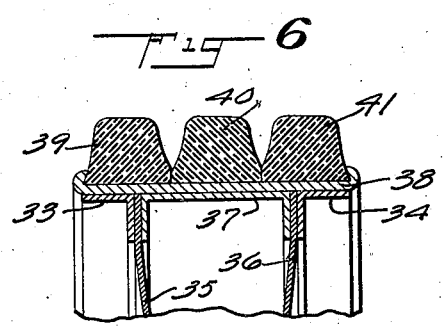
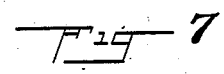
C. J. Dalton INVENTOR.
BY
Thomas Howe ATTORNEY.

Patented Sept. 6, 1927.

1,641,663

UNITED STATES PATENT OFFICE.

CHARLES J. DALTON, OF NEW YORK, N. Y.

VEHICLE WHEEL.

Application filed December 13, 1922. Serial No. 606,572.

This invention relates to vehicle wheels particularly those for use on trucks although it may find application in wheels of vehicles of other character.

The main object of the invention is to provide a device of the character as indicated which shall be simple, inexpensive to construct and strong and efficient in operation.

Other and ancillary objects of the invention will appear hereinafter.

In the accompanying drawings which illustrate the invention—

Fig. 1 is an edge view of a wheel embodying the invention parly in elevation and partly in section;

Fig. 2 is a fragmentary view showing the end of the hub construction;

Fig. 3 is a view similar to Fig. 1 of a plural tired wheel;

Fig. 4 is a view similar to Fig. 1 of a single tired wheel but with a modified form of disk construction;

Fig. 5 is a fragmentary view showing a section through the tire rim and adjacent disks of the form of wheel shown in Fig. 4, but with duplex tires;

Fig. 6 is a view similar to Fig. 5 but with triplex tires; and

Fig. 7 is a view similar to Figs. 5 and 6, but with a different arrangement of disk securing and tire re-enforcing annular members.

Referring to the drawings and first to Figs. 1 and 2 the usual tire comprising the metal tire band 1 and the rubber tire 2 has placed within it the dished metal plates or disks 3 and 4, the concave surfaces being inward and the convex surfaces outward. These plates slide with an easy fit into the band 1 and are held therein by the annular rings 5 and 6 of L-shaped or right angle cross section. These rings 5 and 6 are forced into the band 1 by hydraulic pressure and act to re-inforce the tire and at the same time hold the disks 3 and 4 securely in place. The hub comprises a cylindrical portion 7 fitted within central holes in the disks 3 and 4, and the circumferential flange 8. A collar 9 slides upon the portion 7 and may be removed to permit the part 7 to be inserted within the disks. The collar 9 may then be applied and bolts 10 inserted and secured whereupon the internal edges of the disks 3 and 4 are securely held between the flanges 8 and 9 and also the hub is secured in position.

A convenient method of assembling the wheel is to place the tire band upon the bed plate of a hydraulic press. The ring 5 is then laid thereon, the disks 3 and 4 are laid upon the ring 5 and the ring 6 is laid upon the disks. The platen of the press is then moved downwardly forcing the rings 5 and 6, carrying with them the disks 3 and 4, into the tire band until the desired position is reached.

Referring now to Fig. 3, a wheel of sufficient width to accommodate the two tires 11 and 12 is formed by forcing two structures similar to the interior structure of the wheel of Fig. 1 into the metal band 13 upon which are mounted the two tires 11 and 12. Thus one of the structures corresponding to the interior structure of the wheel of Fig. 1, namely the rings 14 and 15 of angular cross section and the dished disks 16 and 17, and the similar structure composed of the rings 18 and 19 and the disks 20 and 21 are forced by hydraulic pressure within the ring 13 in a manner as already described in connection with Fig. 1. The hub portions 22 and 23 are constructed and mounted in the disks in a manner as described in connection with Fig. 1.

Referring now to Fig. 4 metal disks 24 and 25 are concaved inwardly instead of outwardly and are held in position within the tire band 26 by annular rings 27 and 28 of angular cross section which are forced within the band 26 by high hydraulic pressure, the disks being spaced and held in proper lateral position with relation to the band 26 by means of a ring 29 channel-shaped in section. The hub may be secured in the disks in the manner as already described in connection with Figs. 1, 2 and 3 inclusive and the parts may be assembled by a hydraulic press in the same manner.

In Fig. 5 the tire band 30 is made of sufficient width to accommodate two rubber tires 31 and 32. The rings of angular section 33 and 34, the disks 35 and 36 and the ring 37 of channel-shaped section are assembled within the band 30 in a manner as described in connection with Fig. 4.

A similar construction is shown in Fig. 6 except that the tire band 38 is made broad enough to accommodate the three rubber tires 39, 40 and 41.

In the structure shown in Fig. 7 the manner of assembling the structure is the same as shown in Fig. 4 except that in place of the ring of channeled section as shown in Fig. 4 there is employed between the disks an annular band 42 within which are forced the rings 43 and 44 of angular cross section, this structure being adapted to provide any desired width of channel that is desired by varying the width of the band 42 and at the same time securing the characteristics of a channel-shaped structure as shown in Figs. 4 to 6 inclusive.

While the invention has been illustrated in what is considered its best applications it may have other embodiments without departing from its spirit as embraced by the claims and is not therefore limited to the structures shown in the drawings.

What I claim is:

1. In a vehicle wheel the combination with a rim, of a central portion and means forced within said rim, and held therein by frictional engagement, for securing said central portion to said rim on one side and means on the other side of said central portion for securing said central portion in said rim.

2. In a vehicle wheel the combination with a rim, of a disk and means forced within said rim, and held therein by frictional engagement, for securing said disk and another disk secured in said rim.

3. In a vehicle wheel the combination with a rim, of a central portion and an annular member forced within said rim, and held therein by frictional engagement, for securing said central portion to said rim on one side and means on the other side of said central portion for securing said central portion in said rim.

4. In a vehicle wheel the combination with a rim, of a central portion and an annular member of angular cross section forced within said rim, and held therein by frictional engagement, for securing said central portion to said rim on one side and means on the other side of said central portion for securing said central portion in said rim.

5. In a vehicle wheel the combination with a rim, of a plurality of disks and annular members forced within said rim at the outer sides of said disks for securing said disks within said rim.

6. The combination with a rim, of a rubber tire mounted thereon, a pair of concave disks within said rim and annular members forced within said rim outside said disks for securing said disks within said rim, and a hub portion secured to said disks.

7. The combination with a rim, of a rubber tire mounted thereon, a pair of concave disks within said rim, annular spacing means within said disks and annular members forced within said rim outside said disks for securing said disks within said rim, and a hub portion secured to said disks.

In testimony whereof I have signed this specification this 22nd day of September, 1922.

CHARLES J. DALTON.